United States Patent
Murakami (10) Patent No.: US 7,394,462 B2
(45) Date of Patent: Jul. 1, 2008

(54) SUPERIMPOSING APPARATUS AND METHOD FOR BROADCASTING THREE-DIMENSIONAL COMPUTER GRAPHICS IMAGE

(75) Inventor: Kozo Murakami, Sapporo (JP)

(73) Assignee: Kabushiki Kaisha Micronet, Chuo-ku, Sapporo (JP)

( * ) Notice: Subject to any disclaimer, the term of this patent is extended or adjusted under 35 U.S.C. 154(b) by 76 days.

(21) Appl. No.: 10/207,982

(22) Filed: Jul. 31, 2002

(65) Prior Publication Data
US 2003/0210351 A1    Nov. 13, 2003

(30) Foreign Application Priority Data
May 13, 2002   (JP)   ............................. 2002-137391

(51) Int. Cl.
*G06T 15/00* (2006.01)

(52) U.S. Cl. .................. 345/419; 345/629; 345/563; 345/584; 345/632; 345/633; 345/634; 345/638; 348/473

(58) Field of Classification Search ................ 386/95; 345/503, 629, 634, 563, 584, 589, 638, 632, 345/419; 348/473
See application file for complete search history.

(56) References Cited

U.S. PATENT DOCUMENTS

| | | | |
|---|---|---|---|
| 5,327,156 A | | 7/1994 | Masukane et al. |
| 5,784,046 A | * | 7/1998 | Cahill, III .................... 345/667 |
| 5,926,647 A | * | 7/1999 | Adams et al. .................. 712/36 |
| 6,049,354 A | * | 4/2000 | Sekine et al. ............ 348/208.6 |
| 6,057,888 A | | 5/2000 | Bril |
| 6,404,928 B1 | * | 6/2002 | Shaw et al. .................. 382/232 |
| 6,429,871 B1 | * | 8/2002 | Katsura et al. .............. 345/501 |
| 6,657,637 B1 | * | 12/2003 | Inagaki et al. ................ 345/629 |
| 6,828,979 B2 | * | 12/2004 | Brouard et al. ............. 345/581 |
| 6,937,766 B1 | * | 8/2005 | Wilf et al. .................... 382/229 |
| 2002/0054242 A1 | * | 5/2002 | Suito et al. .................... 348/700 |
| 2002/0145612 A1 | * | 10/2002 | Blythe et al. ................. 345/581 |
| 2003/0027517 A1 | * | 2/2003 | Callway et al. ............. 455/3.01 |
| 2003/0189578 A1 | * | 10/2003 | Alcorn et al. ................ 345/629 |
| 2003/0210252 A1 | * | 11/2003 | Ludtke et al. ................ 345/629 |
| 2004/0027369 A1 | * | 2/2004 | Kellock et al. .............. 345/716 |

(Continued)

FOREIGN PATENT DOCUMENTS

JP      02-219184      8/1990

(Continued)

*Primary Examiner*—Kimbinh T. Nguyen
(74) *Attorney, Agent, or Firm*—Muncy, Geissler, Olds & Lowe, PLLC (57) ABSTRACT

A superimposing apparatus and method for broadcasting a 3DCG image can calculate and superimpose additional information such as characters and figures expressed by a 3DCG image on a TV frame in real time by combining a general three-dimensional graphics accelerator board and a conventional TV broadcasting hardware and devising a software processing. The superimposing apparatus performs a rendering process for rendering a 3DCG image datum by a three-dimensional graphics accelerator and a mixing process for mixing a 3DCG image and an input TV signal by a superimposer. The rendering process is carried out concurrently with the mixing process. A frame to be mixed is a previous frame advanced by one frame from a frame to be concurrently rendered. A system memory to be read out is changed to even frames and odd frames in accordance with an input TV signal so as to avoid an interference of rendering and superimposing.

13 Claims, 5 Drawing Sheets

U.S. PATENT DOCUMENTS

| | | | |
|---|---|---|---|
| 2004/0090391 A1* | 5/2004 | Kondo | 345/1.1 |
| 2004/0223003 A1* | 11/2004 | Heirich et al. | 345/629 |

FOREIGN PATENT DOCUMENTS

| | | | |
|---|---|---|---|
| JP | 05-091413 | 4/1993 | |
| JP | 2001-092985 | 4/2001 | |
| JP | 2002-095008 | 3/2002 | |
| WO | WO-99/23831 A2 | 5/1999 | |
| WO | WO-01/52050 A1 | 7/2001 | |

* cited by examiner fig.1. Background Art fig.2.

SUPERIMPOSING APPARATUS AND METHOD FOR BROADCASTING THREE-DIMENSIONAL COMPUTER GRAPHICS IMAGE

BACKGROUND OF THE INVENTION

This invention relates to an apparatus and method for transferring and displaying a superimposed image using a three-dimensional computer graphics (3DCG) image in a picture upon transferring information for rapid display such as a sport broadcasting, an election advisory, or the like.

Figure 1:
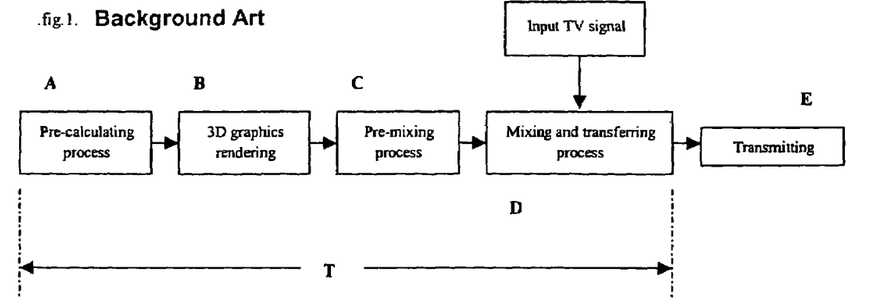
FIG. 1 is a schematic diagram illustrating a process for superimposing a 3DCG image on an input TV signal in real time.

A basic principle of rendering a 3DCG image in real time and superimposing the mixed signal on an input television (TV) signal will be described below by referring to the drawing for convenience of explanation. FIG. 1 is a schematic diagram illustrating a process for superimposing a 3DCG image on an input TV signal in real time. As shown in FIG. 1, information required for rendering a 3DCG image is pre-calculated to be sent to a three-dimensional graphics accelerator (A), and then a 3DCG image is formed by rendering the pre-calculated information in the accelerator (B). The formed 3DCG image is transferred to a superimposer and is pre-mixed prior to composing it with an input TV signal (C). A mixing process (D) forms a broadcasting image including the TV signal mixed with superimposed images and a broadcasting image signal is transmitted (E).

In order to realize a visually smooth animation, it is necessary to display a 3DCG image to meet National Television System Committee (NTSC) broadcasting system or Phase Alteration by Line (PAL) broadcasting system (for example, about 60 fields per second in the NTSC broadcasting system). However, in order to render a 3DCG image and then to mix the image with the input TV signal and broadcast the mixed signal in real time processing, a period of time T required for serial processing from the pre-calculating process (A) to the mixing and transferring process (D) is limited to about 16.67 msec (60 field/second) to 20 msec (50 field/second). In addition, since a given period of time is required to transfer the 3DCG image datum from the accelerator to a system memory and from the system memory to the superimposer, respectively, a period of time for rendering process must be necessarily shorten. Consequently, when a complex 3DCG image is transferred as a superimposed image, all processes cannot be completed within the above time limit of period and thus it is difficult to transfer necessary fields.

Thus, a special system that is designed for the purpose of a broadcasting application to process a 3DCG image was used. The special system has a special hardware including a function of superimposing and a function of processing the 3DCG image. The system having these functions takes a high cost in production due to high specialty. It is difficult for broadcasting staffs using the system to adopt many systems on the aspect of cost performance ratio. On the other hand, a performance of a current three-dimensional graphics accelerator is progressing and current 3D accelerators will soon become obsolete or outmoded. Accordingly, since a new, specialized system would clearly be obsolete soon after it was bought, it was a mistake to introduce a new expensive three-dimensional graphics accelerator integrated with a transferring function and a hardware that are designed for the above purpose of broadcasting.

As a measure for replacing such a very expensive special broadcasting system and for shortening a process period of time to transfer a 3DCG image, Japanese Patent Public Disclosure No. HEISEI 5 (1993)-91413 discloses a superimposing apparatus in which, before broadcasting, a 3DCG image that rendered a necessary image has been once stored in a storage device such as a hard disk memory or the like, and then the stored 3DCG image is invoked at a suitable timing upon broadcasting the 3DCG image and is mixed and transferred.

However, such a superimposing apparatus requires a mass-storage device since the apparatus must pre-render necessary images and store them in the storage device. Since the apparatus also requires a pre-rendering time, it induces vainness in economy and time. Accordingly, the apparatus cannot comply with an application of a superimposer requiring immediacy.

OBJECT AND SUMMARY OF THE INVENTION

An object of the present invention is to provide a superimposing apparatus for broadcasting a 3DCG image that can calculate and superimpose additional information such as characters and figures expressed by a 3DCG image on a TV frame in real time by means of combining a general three-dimensional graphics accelerator board and a conventional TV broadcasting hardware and devising a software processing.

Another object of the present invention is to provide a superimposing method for broadcasting a 3DCG image that can calculate and superimpose additional information such as characters and figures expressed by a 3DCG image on a TV frame in real time by means of combining a general three-dimensional graphics accelerator board and a conventional TV broadcasting hardware and devising a software processing.

Still another object of the present invention is to provide a superimposing apparatus for broadcasting a 3DCG image that can enhance a three-dimensional graphics processing ability by merely exchanging a board of the three-dimensional graphics accelerator in the case where a performance of the accelerator is improved and can utilize a current technology with a minimum cost.

Still another object of the present invention is to provide a superimposing method for broadcasting a 3DCG image that can enhance a three-dimensional graphics processing ability by merely exchanging a board of the three-dimensional graphics accelerator in the case where a performance of the accelerator is improved and can utilize a current technology with a minimum cost.

A superimposing apparatus for broadcasting a 3DCG image in accordance with the present invention comprises: a three-dimensional graphics accelerator for forming a 3DCG image by rendering a 3DCG image datum; and a superimposer for forming a broadcasting image on which said 3DCG image is superimposed by mixing the 3DCG image formed by the three-dimensional graphics accelerator with an input TV signal. The three-dimensional graphics accelerator and superimposer are constructed to operate concurrently.

Since the three-dimensional graphics accelerator and superimposer are constructed to operate simultaneously in a concurrent mode, it is possible to form a 3DCG image having the desired number of fields in real time and transmit it as a superimposed image if a period of time in which the three-dimensional graphics accelerator processes a frame and a period of time in which the superimposer processes a frame are within a limit period of time (in fact, a longer one of both periods of time). Although the limit period of time is different in the above broadcasting system, it will be about 16.67 msec (60 field/second) in NTSC system (even if it is the shortest period of time). Preferably, a frame to be mixed in the superimposer is a previous frame advanced by one frame from a frame to be concurrently rendered in the three-dimensional computer graphics accelerator. This means that a memory capacity for temporarily storing the frame rendered in the three-dimensional graphics accelerator can be suppressed as small as possible until the rendered frame is mixed with an input TV signal having a corresponding frame.

A three-dimensional graphics accelerator to be used in the apparatus of the present invention is a general-purpose graphics accelerator board which has a function of processing a 3DCG image at a high speed but is not contemplated for a TV broadcasting application. A superimposer to be used in the apparatus is a superimposer board which has a function of mixing a frame memory datum in a TV broadcasting application but is not contemplated to process a 3DCG image at a high speed. Also, the apparatus of the present invention can be constructed by installing the graphics accelerator board and superimposer board in a general-purpose compact computer that includes at least two CPUs or a MPU. Preferably, the apparatus of the present invention includes a system memory that can read out a frame memory (a video memory) datum from the graphics accelerator board and write a frame memory (a video memory) datum into the superimposer board.

A general-purpose graphics accelerator board and a superimposer board can be used. This requires no special system designed to transfer a 3DCG image in real time.

Further, if a performance of a three-dimensional graphics accelerator is improved, it is possible to enhance an ability of a three-dimensional graphics process by merely exchanging a new board for the old one and also possible to utilize a current technology with a minimum cost. Also, the apparatus of the present invention can be constructed by installing a graphics accelerator board and a superimposer board in a general-purpose compact computer. This similarly requires no expensive system designed for the application of broadcasting. It is possible to produce a high performance superimposing apparatus for broadcasting a 3DCG image more inexpensively. A frame memory datum (a video memory) is transferred between the graphics accelerator board and the superimposer board through the system memory. This eliminates an additional storage device for a 3DCG image and contributes to reduce a cost.

The apparatus of the present invention can form a 3DCG image, mix it with an input TV signal, and transmit the mixed signal. Consequently, a change or motion of contents and figure configurations displayed on the basis of external information can be altered in real time.

Further scope of applicability of the present invention will become more apparent from the detailed description given hereinafter. However, it should be understood that the detailed description and specific examples, while indicating preferred embodiments of the invention, are given by way of illustration only, since various changes and modifications with the spirit and scope of the invention will become apparent to those skilled in the art from this detailed description.

BRIEF DESCRIPTION OF THE DRAWINGS

The foregoing and other features of the present invention will become apparent to one skilled in the art to which the present invention relates upon consideration of the invention with reference to the accompanying drawings which are given by way of illustration only, and thus are not limitative of the present invention, and wherein.

DETAILED DESCRIPTION OF THE PREFERRED EMBODIMENTS

Embodiment in accordance with the present invention will be described below by referring to the drawings.

Figure 2:
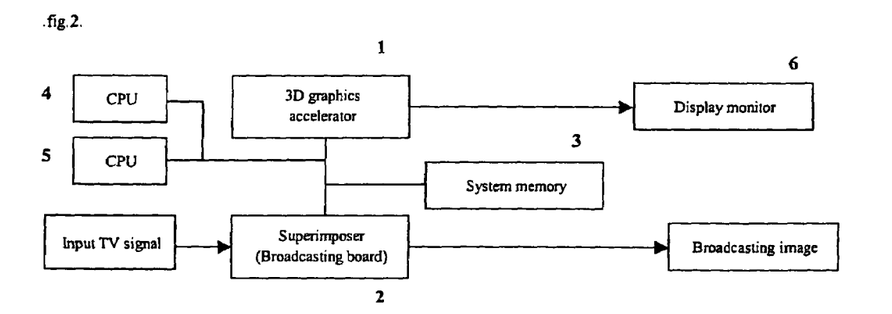
FIG. 2 is a block diagram of an embodiment of a superimposing apparatus for broadcasting a 3DCG image in accordance with the present invention.

A superimposing apparatus for broadcasting a 3DCG image, as shown in FIG. 2, includes a multiprocessor system. The multiprocessor system includes a three-dimensional graphics accelerator 1 for processing a high speed 3DCG image, a superimposer 2 for superimposing the 3DCG image on an input TV signal, a system memory 3 disposed between the three-dimensional graphics accelerator 1 and the superimposer 2, and two central processing units (CPU) 4 and 5 for controlling the three-dimensional graphics accelerator 1 and superimposer 2, respectively. The CPUs 4 and 5 control the respective three-dimensional graphics accelerator 1 and superimposer 2 individually. A single CPU may be used to control them, if the CPU has a performance that can complete a process described below within a given period of time. A CPU that controls an operating system (OS) in the present apparatus may be diverted to control them. It will be easily understood for a person skilled in the art that a microprocessor unit (MPU) can be substituted for a plurality of CPUs. A display monitor 6 is provided to confirm an operation of the multiprocessor system by an operator. The operator manually controls the operation of the multiprocessor system in accordance with information on the display monitor 6.

It should be noted that such construction can be realized not by using a special device designed for broadcasting application but by attaching a general board of the three-dimensional graphics accelerator 1 to an accelerated graphics port (AGP) slot and also attaching a board of the superimposer 2 to a protocol control information (PCI) slot in a general purpose computer having a plurality of CPUs, a work station, or the like. A three-dimensional graphics accelerator board that can calculate a 3DCG image at high speed and high quality is commonly universalized in a general application except for a broadcasting application. The board improves its performance day by day. Accordingly, it should be noted that the three-dimensional graphics accelerator can be selected and changed in compliance with applications and costs.

A method for transmitting 3DCG image as a superimposed image by using the above constructed apparatus of the present invention will be described below by referring to FIG. 3.

The method comprises: a process (S1) of pre-processing information necessary for a rendering process; a process (S2) of forming a 3DCG image having one frame by carrying out a rendering process in the three-dimensional graphics accelerator 1; a process (S3) of loading a frame buffer by storing a 3DCG image datum in a frame memory (video memory) in the three-dimensional graphics accelerator 1; a process (S4) of reading out the 3DCG image datum stored in the frame memory (video memory) in the three-dimensional graphics accelerator 1 into the system memory 3; a process (S5) of pre-mixing the image datum read out into the system memory 3; a process (S6) of transferring the pre-mixed image datum to the frame memory in the superimposer 2 to superimpose the datum on the input TV signal; and a process (S7) of transmitting the mixed signal from the superimposer 2.

Such processes in the three-dimensional graphics accelerator 1 and superimposer 2 are carried out as a chain of a work. In the present invention, the three-dimensional graphics accelerator 1 operates together with the superimposer 2. That is, it is one of the most significant features in the present invention that the mixing process is proceeded in the superimposer 2 when the rendering process is proceeded in the three-dimensional graphics accelerator 1.

In order to effect the processes from the rendering process to the mixing process in a concurrent mode, a rendering frame in the three-dimensional graphics accelerator 1 is delayed by one frame from a mixing frame in the superimposer 2. In the prior art, when a smooth animation in a field unit described above is realized within a time limit of period T determined by the number of frames to be transmitted, serial processes including the rendering and mixing processes must be carried out within the time limit of period in accordance with NTSC broadcasting system or PAL broadcasting system. The time limit of period T is about 16.67 msec per second (about 60 field/second) in the case of the NTSC system. However, in the present invention, the rendering process and mixing process are carried out within the time limit of period T, respectively.

In more detail, the CPU 4 designates information necessary to render the 3DCG image datum to the three-dimensional graphics accelerator 1 (pre-calculating process S1), causes the three-dimensional graphics accelerator 1 to start the rendering process S2, and causes the system memory 3 to read out the 3DCG image stored in the frame memory (video memory) in the three-dimensional graphics accelerator 1 (frame buffer loading process S3). The present invention can be applied to transmission of a superimposed image using the 3DCG image by completing the processes from pre-calculating process S1 to the frame buffer loading process S3 within the time limit of period T.

The CPU 5 operates a pre-mixing process S5 for mixing the 3DCG image (S4) read out into the system memory 3, transfers the pre-mixed datum to a mixing frame in the superimposer 2, operates a mixing process S6 in accordance with an input TV signal S in the superimposer 2, and transmits them (S7). In an embodiment shown in FIG. 3, the apparatus of the present invention has a third CPU 7. The CPU 7 covers a basic process of a system such as an OS or the like in the above serial processes. The CPU 4 or 5 may cover the basic process in its idle time in lieu of the CPU 7.

Figure 3:
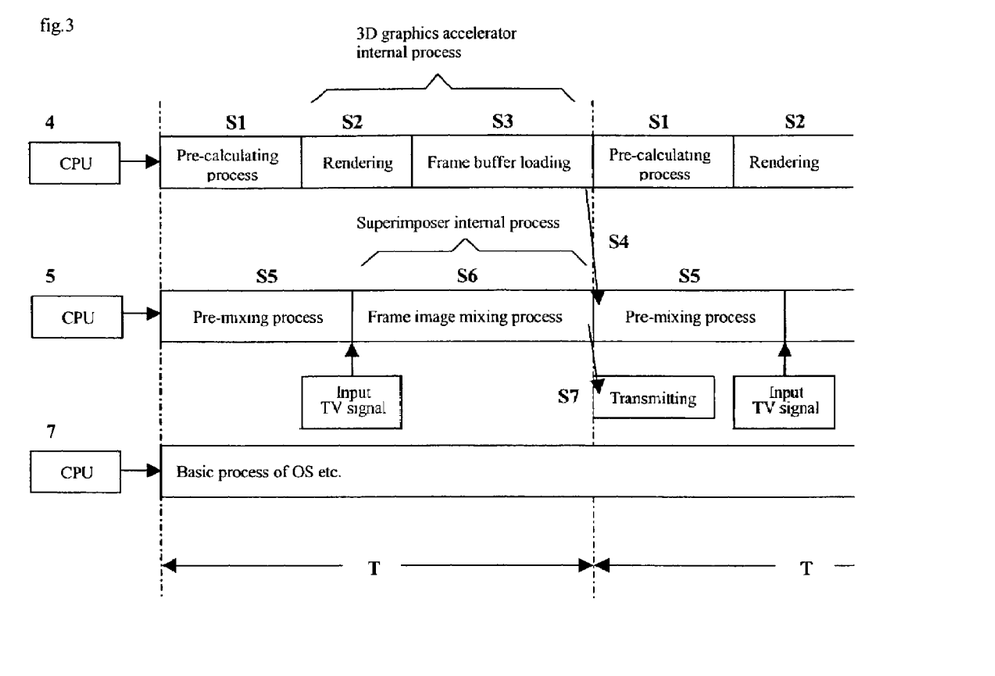
FIG. 3 is a schematic diagram illustrating a flow of processes required in the apparatus shown in FIG. 2.
Figure 4:
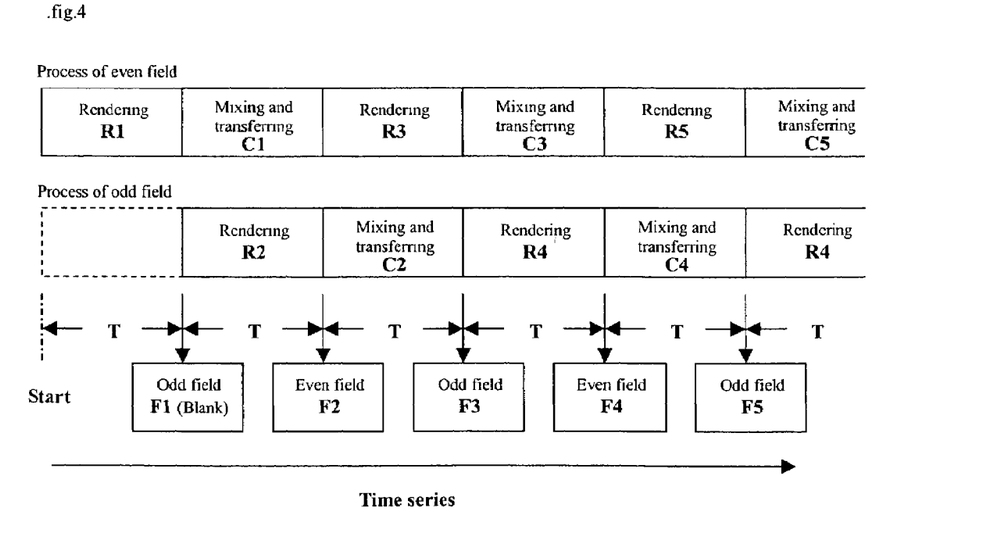
FIG. 4 is a time-line chart illustrating a relationship between a field transfer and a process in an embodiment of the present invention.

In another aspect, the concurrent processes shown in FIG. 3 can be realized by alternately repeating a process of odd fields and a process of even fields, as shown in FIG. 4. Rendering R1, R2, R3, R4, . . . shown in FIG. 4 unify the pre-calculating process S1, rendering process S2, frame buffer loading process S3 shown in FIG. 3 as a single block. Similarly, mixing and transferring C1, C2, C3, . . . unify the pre-mixing process S5, transferring process, frame mixing process S6 shown in FIG. 3 as a single block.

The above processes are explained in accordance with time series direction. Firstly, rendering R1 for the first even field F2 starts in the three-dimensional graphics accelerator 1. The first odd field F1 is transmitted as a blank image cleared before hand, since the image to be transferred by the superimposer 2 is not prepared when the rendering RI is completed. After completing the rendering R1, rendering R2 for the second odd field F3 starts and mixing and transferring process C1 for the first even field F2 in the superimposer 2 starts. When the rendering R2 is completed, the first even field F2 for broadcasting processed in the mixing and transferring process C1 is transmitted. By sequentially repeating the processes in the odd fields and even fields, the second odd field F3, the second even field F4, the third odd field F5 . . . are sequentially transmitted.

Figure 5:
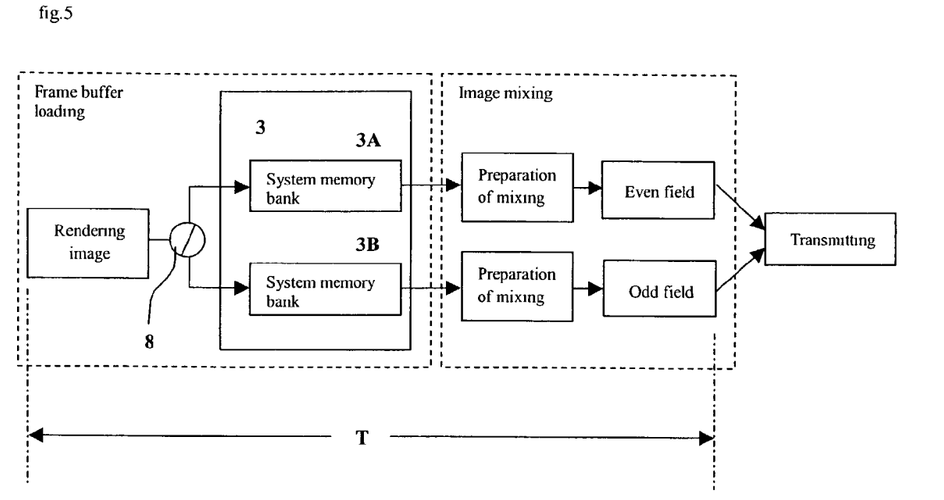
FIG. 5 is a block diagram illustrating a manner for transferring a rendering image every field in an embodiment of the present invention.

Since reading and writing processes conflict with each other if the same memory space is designated when transferring a frame memory to the system memory after completing the rendering process and when transferring a frame memory from the system memory to the superimposer as a pre-mixing process in the case of effecting the concurrent action, a memory bank to be used should be changed for an odd field process and an even field process. FIG. 5 shows a more actual process flow to achieve this object. A flag 8 is a flag for changing the memory bank. A memory bank 3A is used for the even field process while a memory bank 3B is used for the odd field process. The flag 8 is changed in accordance with an input TV signal transferred into the superimposer 2.

Figure 6:
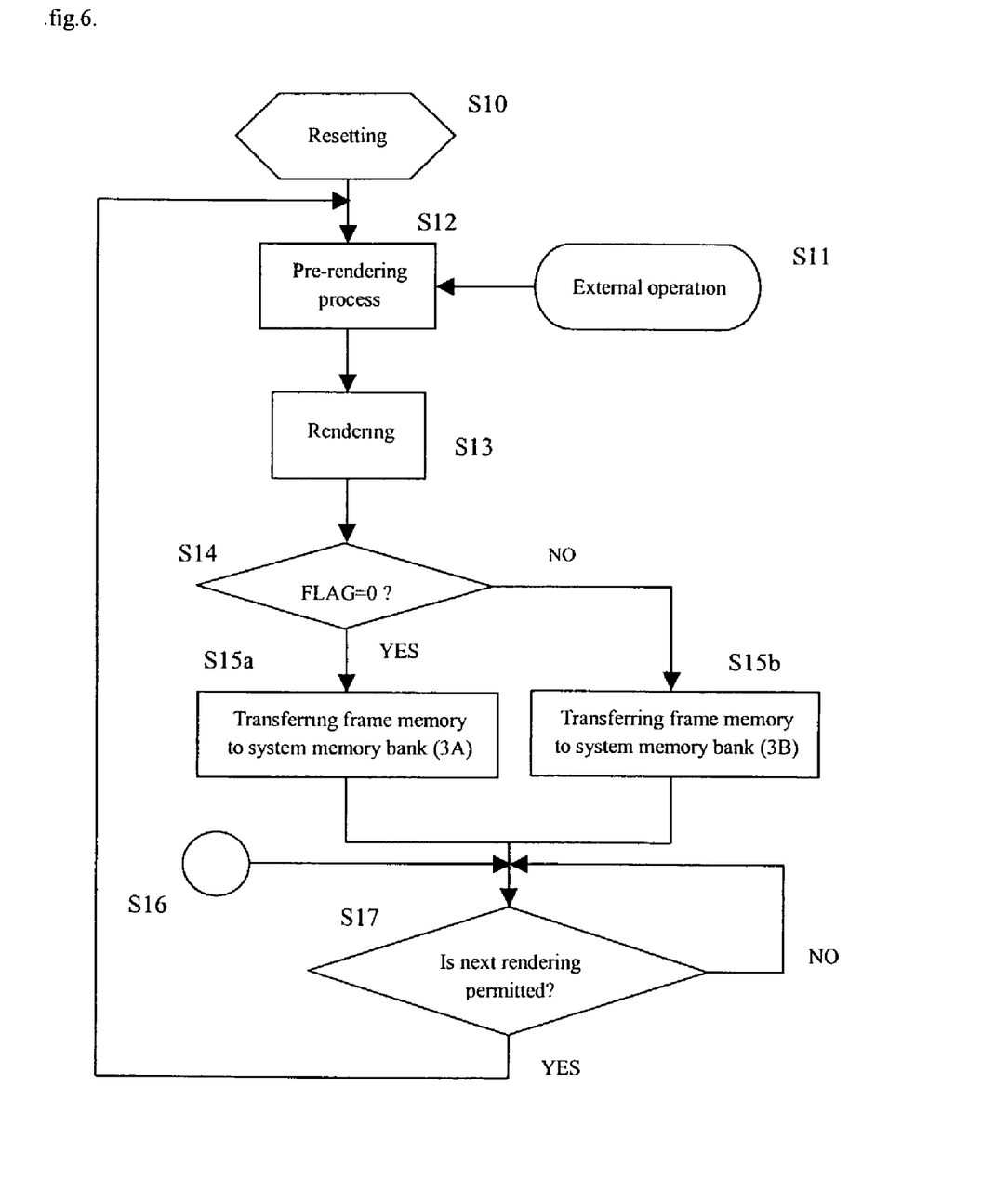
FIG. 6 is a flow chart of a CPU for carrying out a rendering process of a three-dimensional image in an embodiment of the present invention.

In more detail, as shown in FIG. 6, the flag 8 (see FIG. 4) is cleared into zero (0) in an resetting S10 and a system memory having a resolution required for transferring and having two banks is reset into a blank state. An operator inputs operating information in an external operation S11 to reflect the information in a pre-rendering process S12. This includes, for example, a change of display contents of superimposed images, a displacement of a display position, and the like. In rendering S13, the three-dimensional graphics accelerator 1 renders the 3DCG image. The rendered image is transferred to the system memory bank 3A or 3B (S15a or S15b) on the basis of a condition branch S14. Then, after waiting for a result of a permitting process S16, it is decided whether rendering of a next frame should be started or not in accordance with a condition of the condition branch S17. These processes are controlled by one of the CPUs. The result of the permitting process S16 is obtained from the process in the superimposer 2 shown in FIG. 7. The result is a protective measure by which the process in the rendering is prevented from preceding the mixing and transferring process in the superimposer. When being permitted, a process returns to the external operation S11 and pre-rendering process S12 again. If a system stopping process is carried out in the external operation S11, an ending process is done rapidly to bring any process into coming out from the loop. Then, the process is ended safely.

Figure 7:
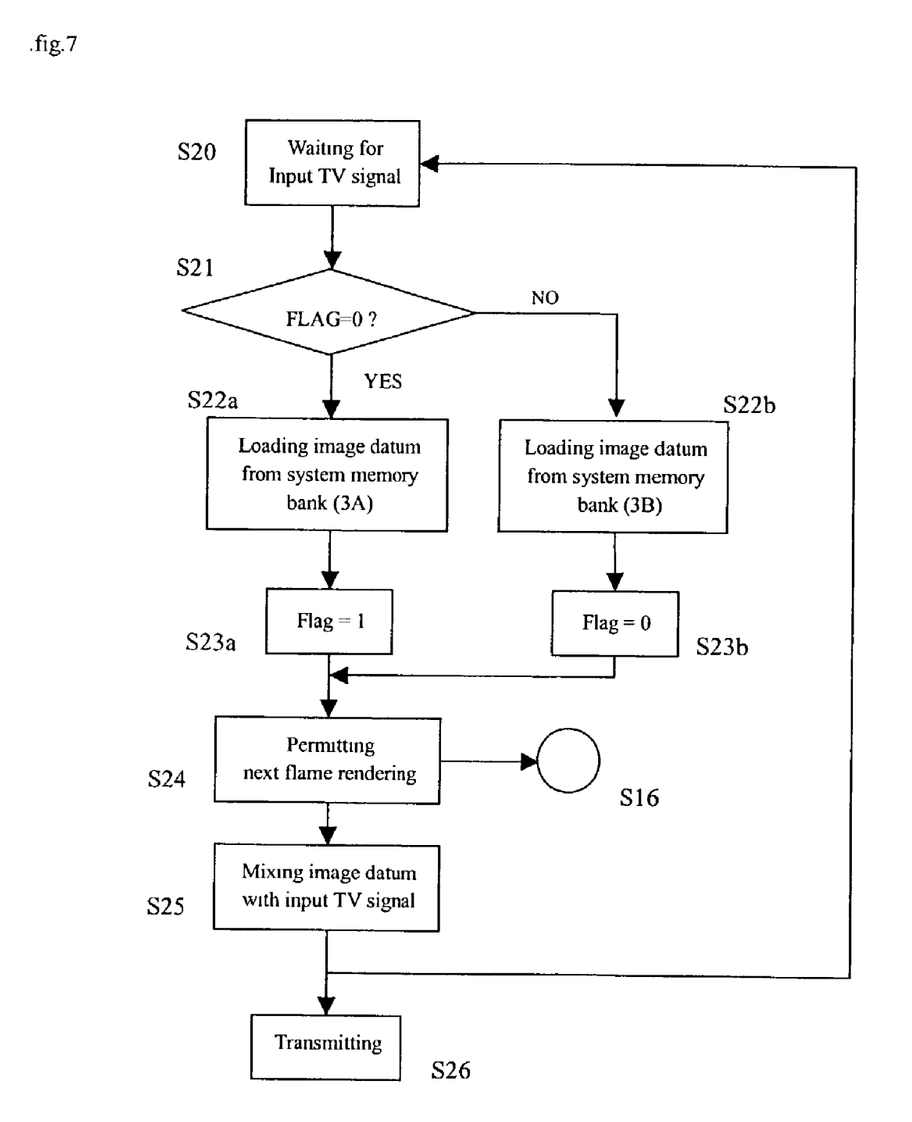
FIG. 7 is a flow chart of a CPU for carrying out a mixing and transmitting process in an embodiment of the present invention.

Simultaneously with the start of the rendering process in the three-dimensional graphics accelerator 1 shown in FIG. 6, the other CPU starts a mixing and transferring process in the superimposer 2 shown in FIG. 7. A process for waiting for intervening of an input TV signal from the external is performed firstly in the superimposer. When the intervening signal is received, the 3DCG image datum rendered from the system memory bank 3A or 3B can be loaded (S22a or S22b) in accordance with a state (S21) of the flag 8 (see FIG. 4). Then, a flag inversion process is carried out in accordance with an indication of a flag set S23a or S23b. Next, switching of the memory bank to be used is effected. A permitting process S24 is issued to the process S17 for waiting for permission of rendering pursuance shown in FIG. 6. This synchronizes serial rendering processes shown in FIG. 6 with the trailing image mixing process S25 and transmitting process S26. The concurrent action processes shown in FIG. 2 are completely synchronized.

On the other hand, the basic process of the OS and the like by using the CPU 7 shown in FIG. 3 can be carried out during the process S17 for waiting for permission of rendering pursuance shown in FIG. 6 or during the process S20 for waiting for the input TV signal shown in FIG. 7. The idle time of the CPU 4 or CPU 5 can be utilized in lieu of the CPU 7. The OS can automatically select this action.

According to the present invention, it is possible to combine a generally universalized three-dimensional graphics accelerator and a broadcasting board used currently for broadcasting that can be utilized in a multiprocessor personal computer (PC) or working storage (WS) even if there is not a hardware for mixing a high quality 3DCG image in real time for the purpose of broadcasting. Consequently, it is possible to construct a apparatus for broadcasting a superimposed image that can superimpose a 3DCG image on an input TV signal in real time without designing a new hardware.

Further, this means that a high quality 3DCG image can be obtained by exchanging a conventional three-dimensional graphics accelerator for a new three-dimensional graphics accelerator if a performance of the accelerator is improved in the future. This is a great merit in cost in comparison with production of a hardware having a broadcasting function. A period of time for preparing a TV program can be extremely reduced, since a software if or transferring a superimposed image is not altered to meet a new hardware.

From the above description of the invention, those skilled in the art will perceive improvements, changes and modifications. Such improvements, changes and modifications within the skill of the art are intended to be covered by the appended claims.

The entire disclosure of Japanese Patent Application No. 2002-137391 filed on May 13, 2002 including specification, claims, drawings and summary is incorporated herein by reference in its entirety.

The invention claimed is:

1. A superimposing apparatus for broadcasting a 3DCG image, comprising:
   a three-dimensional graphics accelerator for forming a 3DCG image by rendering a respective 3DCG image at each frame period; and
   a superimposer for forming a broadcasting image on which said 3DCG image is superimposed by mixing said 3DCG image formed by said three-dimensional graphics accelerator with a current frame of an input TV signal;
   said three-dimensional graphics accelerator and said superimposer are constructed to operate concurrently;
   wherein after the three-dimensional graphics starts to perform rendering the 3DCG image for the current frame and before the three-dimensional graphics accelerator completes rendering the 3DCG image for the current frame, the superimposer starts to mix said 3DCG image for a previous frame only with the current frame of the input TV signal, and the previous frame is immediately adjacent to the current frame by one frame.

2. A superimposing apparatus according to claim 1 wherein said three-dimensional graphics accelerator is a general-purpose graphics accelerator board which has a function of processing a 3DCG image at a high speed but is not contemplated for a TV broadcasting application and wherein said superimposer is a superimposer board which has a function of mixing a frame memory in a TV broadcasting application but is not contemplated to process a 3DCG image at a high speed.

3. A superimposing apparatus according to claim 2 wherein said graphics accelerator board and superimposer board are installed in a general-purpose compact computer which includes at least two CPUs or a MPU.

4. A superimposing apparatus according to claim 2 further comprising: a system memory that can read out a frame memory (a video memory) datum from said graphics accelerator board and write a frame memory (a video memory) datum into said superimposer board.

5. A method for transmitting a 3DCG image as a superimposed image for broadcasting, comprising:
   a process of rendering a respective 3DCG image at each frame; and
   a process of mixing a 3DCG image and a current frame of an input TV signal;
   said mixing process being carried out concurrently with said rendering process;
   wherein after beginning the process of rendering the 3DCG image for a current frame and before completing the process of rendering the 3DCG image for the current frame, the process of mixing starts to perform by mixing the 3DCG image for a previous frame only with the current frame of the input TV signal, and the previous frame is immediately adjacent to the current frame by one frame.

6. A method according to claim 5 wherein said process of rendering a 3DCG image is carried out by a general-purpose graphics accelerator board which has a function of processing a 3DCG image at a high speed but is not contemplated for a TV broadcasting application and wherein said process of mixing a 3DCG image with an input TV signal is carried out by a superimposer board which has a function of mixing a frame memory in a TV broadcasting application but is not contemplated to process a 3DCG image at a high speed.

7. A method according to claim 6 wherein
   said graphics accelerator board and superimposer board are installed in a general-purpose compact computer which includes at least two CPUs or a MPU.

8. A method according to claim 6 wherein said rendered frame memory datum is read out from said graphics accelerator board into said system memory and said frame memory datum read into said system memory is written from said system memory into said superimposer board in order to effect a mixing process.

9. A method according to claim 5 wherein change or motion of contents and figure shapes indicated on the basis of external information is carried out in real time.

10. A superimposing apparatus according to claim 1, wherein said three-dimensional graphics accelerator forms the 3DCG image of one of an even frame and an odd frame, and concurrently said superimposer forms the broadcasting image of the other one of the even frame and the odd frame by mixing said 3DCG image of the other one of the even frame and the odd frame with the input TV signal.

11. A superimposing apparatus according to claim 10, further comprising an even frame memory, an odd frame memory, and a memory switch, wherein said three-dimensional graphics accelerator generates and outputs the 3DCG image of the one of the even frame and the odd frame via the memory switch to a corresponding one of the even frame memory and the odd frame memory, and concurrently said superimposer uses the 3DCG image of the other one of the even frame and the odd frame stored in the other one of the even frame memory and the odd frame memory to form the broadcasting image of the other one of the even frame and the odd frame.

12. A method according to claim 5, wherein said mixing process is carried out for one of an even frame and an odd frame concurrently with said rendering process for the other one of the even frame and the odd frame.

13. A method according to claim 12, wherein said rendering process includes generating and sending the 3DCG image of one of the even frame and the odd frame to a corresponding one of an even frame memory and an odd frame memory, and wherein said mixing process concurrently with the said rendering process includes using the 3DCG image of the other one of the even frame and the odd frame stored in the other one of the even frame memory and the odd frame memory to mix with the input TV signal.

* * * * *